US006694832B1

(12) United States Patent
Gleeson

(10) Patent No.: US 6,694,832 B1
(45) Date of Patent: Feb. 24, 2004

(54) KIT AND METHOD FOR SETTING PROBE DEPTH

(75) Inventor: Eamon P. Gleeson, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/374,730

(22) Filed: Feb. 27, 2003

(51) Int. Cl.$^7$ ............................ G01B 3/18; G01B 21/18

(52) U.S. Cl. ........................... 73/866.5; 33/836; 33/635

(58) Field of Search ........................... 73/866.5; 33/516, 33/529, 644, 655, 719, 810, 832, 836

(56) References Cited

U.S. PATENT DOCUMENTS

| | | | | | |
|---|---|---|---|---|---|
| 3,943,759 | A | | 3/1976 | Kato et al. | |
| 4,174,917 | A | * | 11/1979 | Brower | 408/62 |
| 4,180,914 | A | * | 1/1980 | Lechner | 33/809 |
| 4,216,585 | A | * | 8/1980 | Hatter | 33/836 |
| 4,423,554 | A | * | 1/1984 | Cantrell | 33/836 |
| 4,462,166 | A | * | 7/1984 | Furlong | 33/416 |
| 4,557,106 | A | | 12/1985 | Flowes Williams et al. | |
| 4,638,463 | A | * | 1/1987 | Rockett, Jr. | 365/205 |
| 4,760,847 | A | * | 8/1988 | Vaillancourt | 606/185 |
| 4,930,226 | A | * | 6/1990 | Shindelar | 33/655 |
| 5,189,808 | A | * | 3/1993 | Evans et al. | 33/836 |
| 5,402,584 | A | * | 4/1995 | Kessler | 33/783 |
| 5,490,335 | A | * | 2/1996 | Chu | 33/810 |
| 5,491,907 | A | * | 2/1996 | Vidmar | 33/832 |
| 5,497,560 | A | * | 3/1996 | Pasquerella et al. | 33/836 |
| 5,706,643 | A | | 1/1998 | Snyder et al. | |
| 5,758,433 | A | * | 6/1998 | Alberts | 33/836 |
| 5,870,835 | A | * | 2/1999 | Stieff | 33/600 |
| 5,873,175 | A | * | 2/1999 | Johnston | 33/809 |
| 6,044,573 | A | * | 4/2000 | Cockrill | 33/836 |
| 6,135,760 | A | | 10/2000 | Cusack et al. | |
| 6,195,577 | B1 | * | 2/2001 | Truwit et al. | 600/411 |
| 6,587,184 | B2 | * | 7/2003 | Würsch et al. | 356/4.01 |
| 2001/0014771 | A1 | * | 8/2001 | Truwit et al. | 600/417 |
| 2003/0217479 | A1 | * | 11/2003 | Shen et al. | 33/836 |

FOREIGN PATENT DOCUMENTS

| | | | | |
|---|---|---|---|---|
| JP | 61277048 A | * | 12/1986 | G01N/27/56 |

OTHER PUBLICATIONS

U.S. application Ser. No. 09/989,102, filed Nov. 21, 2001 of Gleeson.

U.S. application Ser. No. 10/374,719, filed Feb. 27, 2003 of Gleeson.

* cited by examiner

*Primary Examiner*—Hezron Williams
*Assistant Examiner*—David A. Rogers
(74) *Attorney, Agent, or Firm*—Nixon & Vanderhye PC

(57) ABSTRACT

A kit is provided to measure the depth to which the tip of a probe should be set inside an assembly such as a combustion can. The acquired depth is then transferred to a set of probes for installation. The fixtures and the associated process ensure that the probe will be in a proper position for accurate measurement and to eliminate inconsistencies in measurement due to probe insertion to different depths.

20 Claims, 5 Drawing Sheets

28
38
40
36
34
16
48
18
22
30, 32
20
26

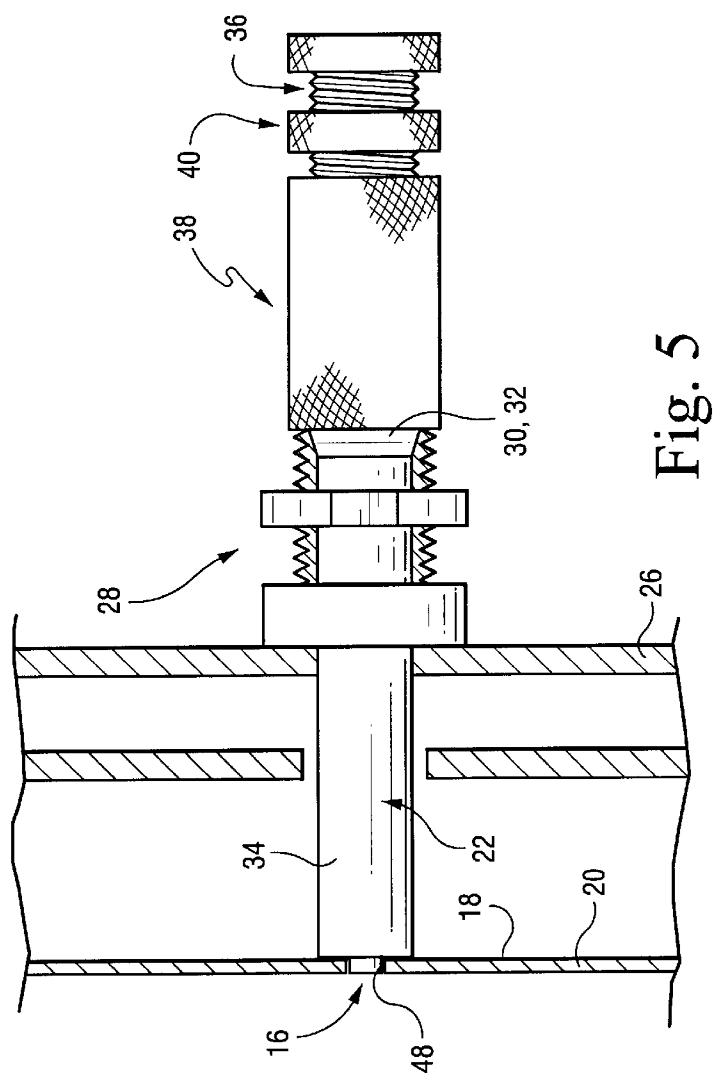
Fig. 5
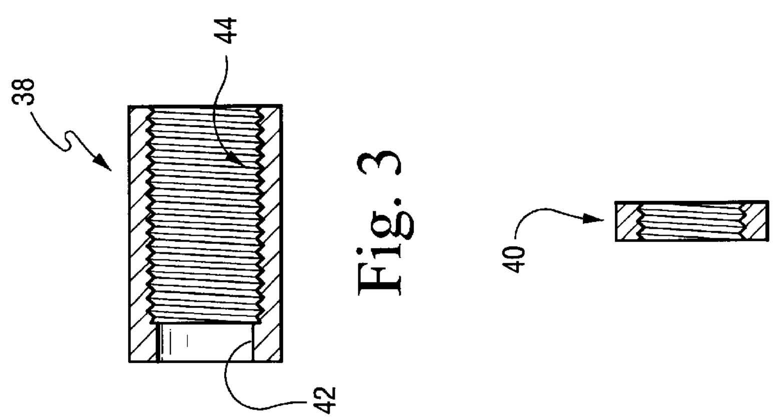
Fig. 3
Fig. 4

KIT AND METHOD FOR SETTING PROBE DEPTH

BACKGROUND OF THE INVENTION

The present invention relates to fixtures and a method for accurately setting probe depth and, more particularly, to a fixture and method for accurately setting dynamic pressure probe depth in a combustion liner.

As part of the monitoring controls and diagnostic tools for an operating combustion system in a rotary machine such as a gas turbine, it is necessary to measure and acquire various data including combustion chamber dynamic pressure. This data is used to confirm proper operational health of the combustion system, and is also used to tune the gas turbine engine so that it is operating with an appropriate balance between combustion dynamics and emissions.

The combustion dynamics measurement probe holder should be inserted to the combustion can so that the tip aligns itself at a certain depth relative to the combustion liner. Typically, the tip is set about 0.030" back from the inside of the liner. The depth of the tip should be identical for all probes used in the turbine.

One way of achieving identical probe depth is to remove the combustion can cover and combustion hardware so that the tip of the probe can be set by measuring its position relative to the inside wall of the combustion liner. Thus, currently, after each combustion can of the turbine is disassembled, the probe depth is set visually. It would be desirable to provide for an accurate and consistent probe tip placement without requiring removal of the combustion hardware and disassembly of the combustion cans of the turbine.

BRIEF DESCRIPTION OF THE INVENTION

The invention provides fixtures and a method for setting the depth of the combustion dynamics probe tip repeatably and accurately in all combustion cans of the turbine.

The fixture of the invention is provided in accordance with an exemplary embodiment as a kit of tools or fixtures for measuring and transferring probe depth. A first, measuring fixture of the kit measures the depth to which the tip of the probe should be set. The acquired depth is then applied to the probe(s) for installation. In an exemplary embodiment, the measurement acquired by the measurement fixture is transferred to a second device that can apply the measured depth to the probe itself. This process ensures that the probe will be placed in a proper position to accurately measure, e.g., the dynamic pressure of the combustion process and eliminate any inconsistencies in measurement that would result from having the probe tips inserted at different depths.

Thus, the invention is embodied in a kit for setting probe depth, comprising a measurement fixture for measuring a target probe insertion depth through a wall of a component, said measurement fixture including a shaft and a tip portion provided at a distal end of said shaft, and an indicator for indicating said target depth on said shaft; and a transfer fixture for transferring a depth indicated by said indicator of said measurement fixture to a probe holder device. The transfer fixture including a housing defining a receptacle for receiving said shaft and said tip portion, the receptacle having an adjustable depth to selectively correspond to the depth indicated by the indicator of the measurement fixture, whereby a probe holder device may thereafter be disposed in said transfer fixture to a depth corresponding to said indicated depth and marked.

The invention is also embodied in a method of accurately placing a probe to a target depth comprising: providing an assembly for receiving the probe comprising a first, liner wall and a second, casing wall, a receptacle being defined in the first wall for receiving a tip of the probe; providing a measurement fixture having a shaft and a tip portion projecting from said shaft a distance corresponding in length to a target length of the probe inwardly from an outer surface of said first, liner wall; disposing the measurement fixture through an orifice defined in said second, casing wall and inserting said tip portion into said receptacle to abut said shaft of said measurement fixture against said outer surface of said liner wall; providing an indication of a position of said shaft at a predetermined point with respect to said second, casing wall; providing a transfer fixture including a housing having a receptacle of variable depth for receiving the measurement fixture; inserting said shaft into said receptacle so that said position indicator is aligned with a predetermined, complimentary portion of the fixture; adjusting a depth of said receptacle so that a bottom of the receptacle engages the tip portion; removing the measurement fixture; inserting a probe holder device into said receptacle so that the probe tip engages the bottom of the receptacle; and marking said probe at a point corresponding to said complimentary portion.

BRIEF DESCRIPTION OF THE DRAWINGS

FIG. 3 is a schematic cross-sectional view of a measurement barrel provided according to the FIG. 1 embodiment of the invention;

FIG. 4 is a cross-sectional view of a lock nut of the measurement fixture provided in accordance with the FIG. 1 embodiment;

FIG. 5 is a schematic illustration of the step of measuring target probe depth using the measurement fixture of FIG. 1;

DETAILED DESCRIPTION OF THE INVENTION

In a turbine, the combustion dynamics probe holders need to be mounted to the combustion can so that the probe tips are all disposed at a certain depth with respect to inside the combustion liner, a certain depth relative to the combustion liner. Typically, the tip is set about 0.030" back from the inside of the liner, although this invention is not limited to that placement and can be used to place the tip beyond, aligned with, or recessed from a surface, such as the inner surface of a combustor liner. As noted above, the prescribed depth should be identical across all probes used in the turbine. To provide for reliable, repeatable probe tip placement, a kit is provided in an embodiment of the invention for determining the proper placement of the probe holder with respect to the combustor casing and liner.

In an exemplary embodiment of the invention, the kit includes a measurement fixture 10 for measuring can depth, and a transfer fixture 12 for transferring the measured can depth to the probe device 14.

Figure 1:
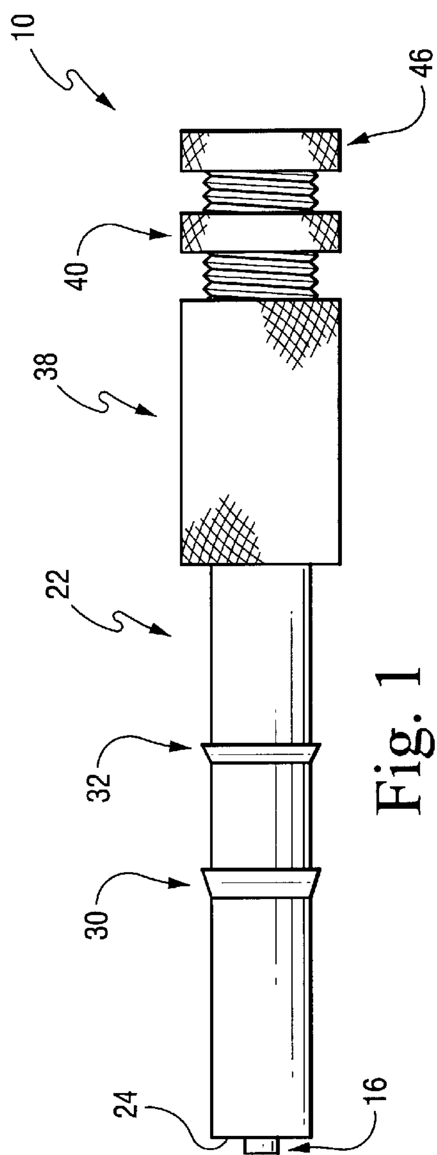
FIG. 1 is a schematic elevational view of a measurement fixture in accordance with an embodiment of the invention.
Figure 2:
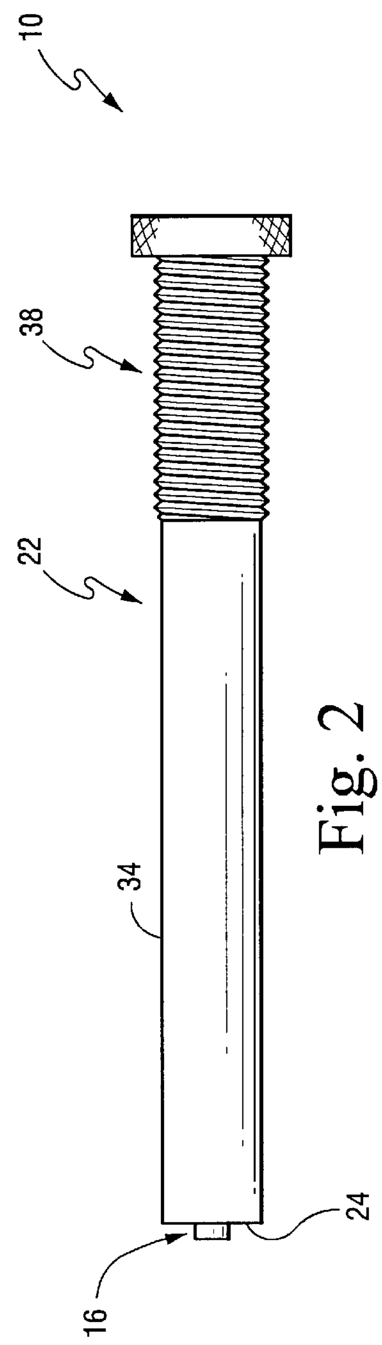
FIG. 2 is an elevational view of the main body of the measurement fixture of FIG. 1.

In the illustrated embodiment, the measurement fixture 10, which for convenience may be characterized as a male measurement fixture, includes a tip portion 16 corresponding in axial length to a desired or target length of the probe tip inwardly with respect to a reference surface, which in the exemplary embodiment is the outer surface 18 of the combustion liner 20 (FIG. 5). Referring to FIGS. 1 and 2, the male measurement fixture further includes an elongated main body or shaft 22 which extends from a shoulder 24 defined with the tip portion and is adapted to span the distance between the reference surface at least to an access/insertion point that is remote from it, e.g., from the combustion liner 20 through and beyond the coupling or other fitting 28 provided on the combustion casing for coupling the probe device 14 to the combustion casing 26. In the illustrated embodiment, access/insertion point is a coupling provided on the combustor casing outer wall, more specifically a Swagelok® fitting 28, although it is to be understood that the invention is not limited to such coupling devices.

Since the illustrated measure fixture is adapted to interface with a Swagelok® connector assembly 28, as described in greater detail hereinbelow, Swagelok® ferrules 30,32 are used to mark or indicate the target probe depth on the measurement fixture 10. For that reason the shaft includes a smooth, unthreaded portion 34 that extends from the shoulder 24 through the casing 26 and connector fitting 28 (for sliding placement of the ferrule(s) 30,32) and a threaded portion 36. It is to be understood, however, that if the target probe depth is indicated, recorded or marked on the measurement fixture in another manner, such as by noting indicia or physically marking the shaft of the measurement shaft, or solely by the position of the distal face of the measurement barrel 38, then the shaft 22 may be threaded along a greater extent of its length or along substantially its entire length. In addition to a measurement barrel 38, a lock nut 40 is provided on the measurement fixture for locking the barrel in a target position, as described in greater detail hereinbelow.

Referring to FIG. 3, in an exemplary embodiment, the measurement barrel 38 has an inner bore including a smooth surface portion 42 and a threaded portion 44. The smooth surface portion is provided to slidably engage the smooth shaft 34 of the measurement fixture whereas the threaded portion 42 is adapted to threadably engage the threaded segment 36 of the measurement fixture. Providing a smooth surface portion as illustrated limits the proximal displacement of the barrel with respect to the measurement fixture main body 22. This ensures that the ferrule(s) slidably disposed on the shaft of the measurement fixture will not undesirably engage the threaded portion 36 of the shaft. It is to be understood, however, that the smooth surface inner diameter portion of the barrel is an optional feature of the structure. In an exemplary embodiment, the measurement fixture 10 is about 8" long, the tip portion 16 is about 0.125 inch, and the threaded portion 36 is about 2 inches long. Furthermore, in an exemplary embodiment, the diameter of the tip portion 16 is about 0.25 inch and the diameter of the shaft 22 of the measurement fixture is about 0.75 inch. A head 46 is provided at the proximal end of the measurement fixture for retaining the measurement barrel 38 and lock nut 40 on the shaft 22. In an exemplary embodiment, the head has an outer diameter of about 1.2 inch and may have a knurled surface to facilitate handling.

Referring to FIG. 3, the measurement barrel 38 advantageously has a total length generally corresponding to the threaded portion 36 of the measurement fixture but the threaded inner bore of the barrel is less than the total length of the barrel by an amount generally corresponding to the length of the lock nut 40 so that if, e.g., the lock nut has a length of about 0.3 inches, the threaded portion of the barrel is about 1.7 inches. In this way, when the barrel is fully engaged with the threaded portion of the shaft and the lock nut 40 is interposed between the barrel 38 and the head 46 of the shaft the threaded portion of the shaft will be fully covered and the barrel will project distally of the threaded portion. Of course the size of the barrel and lock nut is not critical and may be varied, it being understood that, desirably, when the barrel and lock nut are fully engaged with the threaded portion, the threads are covered so that engagement of the ferrule(s) 30,32 and the threads 36 will be avoided.

Referring now to FIG. 5, to measure the target probe depth, the measuring fixture 10 is inserted through the probe connector 28 provided on the combustor casing 26 to dispose the tip 16 in/through the receptacle 48 defined in the combustion liner 20. The measuring fixture is advanced until the shoulder 24 defined between the tip portion and the shaft engages a reference surface 18, which in the illustrated embodiment is the outer surface of the combustion liner 20. The tip portion advantageously has a length that corresponds to the distance that the probe tip desirably extends inwardly from the reference surface. This distance will generally correspond to the liner wall thickness. The tip portion length may be fixed or, if adjustment is desired, the tip portion length can be varied, for example, by providing a threaded tip portion that may be threaded in or out for adjustment or by providing interchangeable tip portions.

The measured target probe depth is then indicated, recorded or marked on the measuring fixture at a predetermined point with respect to the combustor casing 26. In the illustrated embodiment, the predetermined point is the proximal end of the Swagelok® connector and the depth is indicated by the location of front and back Swagelok® ferrules 30,32 that are slidably disposed, in advance, on the shaft 22 of the measuring fixture. Thus, once the fixture is inserted so that the shoulder 24 abuts surface 18, the measurement barrel 38 is rotated to be advanced distally. In the illustrated embodiment, this advances the front and rear ferrules 30,32 until they are snug with the Swagelok® 28. Once the ferrules and barrel are in position to indicate the target probe depth, the lock nut 40 is advanced distally to lock the barrel. The outer surfaces of the barrel and lock nut may be knurled to facilitate manipulation.

It is to be understood that if a connector other than a Swagelok® is provided to secure the probe device with respect to the combustor casing, then the measuring fixture may be marked in another manner. For example, the target depth may be indicated simply by the location of the distal face of the barrel 38 when advanced to engage the respective connector assembly or the combustor casing wall, whichever applies. In the alternative, indicia may be applied to the measuring device as by applying a physical mark, tape or the like to indicate the depth from the tip to a point that is at a determined location with respect to the combustor casing outer surface. As noted above, where a marking method other than ferrule placement is used, the shaft 22 of the measurement fixture need not have a smooth portion 34 and may be threaded along a greater extent of its length.

Figure 6:
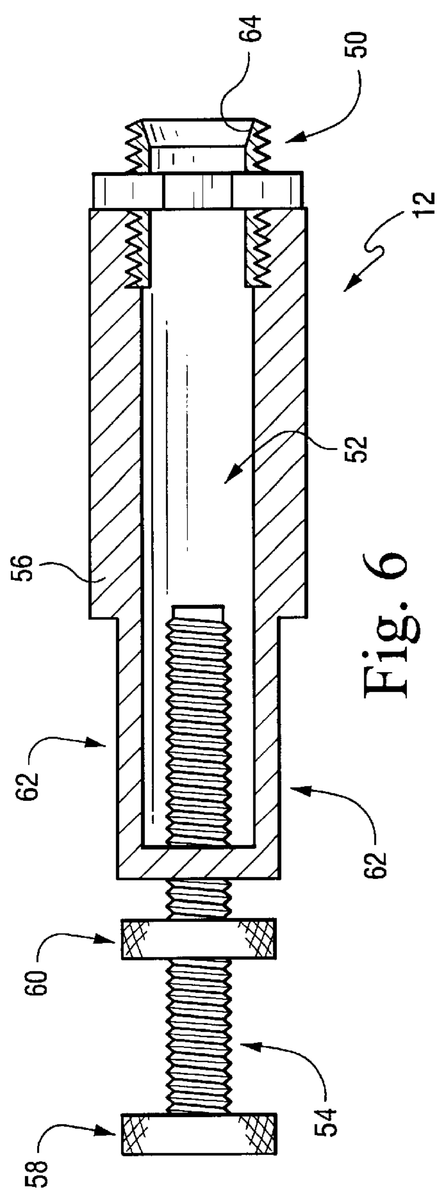
FIG. 6 is a schematic cross-sectional view of a transfer fixture according to an embodiment of the invention.
Figure 7:
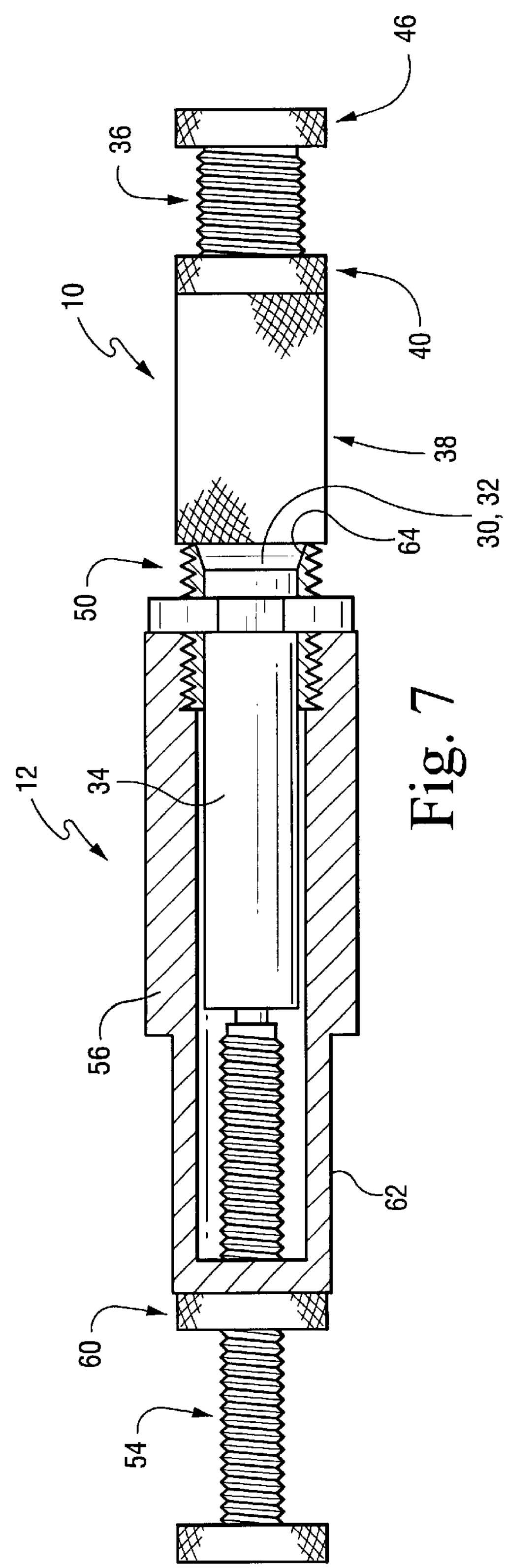
FIG. 7 is a schematic view partly in cross-section showing the transfer of target probe depth from a measurement fixture to transfer fixture.

Referring now to FIGS. 6 and 7, in an embodiment of the invention, a transfer fixture 12 is provided for transferring the target depth determined by the measurement fixture 10 ultimately to the probe device 14 that is to be secured to the combustor, or other assembly measured by the measurement fixture. For convenience, the transfer fixture 12 may be referred to as a female ferrule setting fixture. As can be seen, the transfer fixture includes at a first, open end thereof, a connector 50 corresponding to the connector 28 provided on the combustor casing. Thus, in the illustrated embodiment, a Swagelok® fitting 50 is secured at a first end of the fixture 12. The fixture 12 defines an internal receptacle 52 having a length or depth that is adjustable so that it may be adjusted to correspond to the depth measured or indicated by the measuring fixture. In the illustrated embodiment, the depth of the receptacle of the transfer fixture 12 may be adjusted with threaded bolt 54 which is threadably engaged with the fixture housing 56 to selectively determine the depth of the receptacle 52 of the fixture. In the illustrated embodiment, the threaded bolt has a head 58 with a knurled surface to facilitate its displacement with respect to the fixture housing 56. A lock nut 60 is further provided for locking the bolt with respect to the housing 56. The housing may be faceted to have flat faces as at 62 so that it can be clamped during the measured depth transfer process.

With reference to FIG. 7, the measurement fixture 10, once marked, is slidably inserted through the connector structure 50 into the transfer fixture until the indicator thereof is aligned with a complimentary portion or feature 64 provided on the connector 50. In the illustrated embodiment, the ferrule(s) 30,32 and/or measurement barrel 38 are used to mark the measurement fixture 10 and, thus, the measurement fixture is inserted into the transfer fixture 12 until the ferrules 30,32 are snug with the Swagelok® fitting 50. The depth setting bolt 54 is then adjusted so that the measurement fixture tip 16 engages the depth setting bolt 54. The lock nut 60 is then tightened to lock the depth setting bolt's position. As will be understood, the distance between the tip of the depth setting bolt 54 and the complimentary feature 64 corresponds to the distance between the target depth of the probe tip, e.g., inside the combustion liner and the proximal end of the Swagelok® 28 of the combustor casing.

Figure 8:
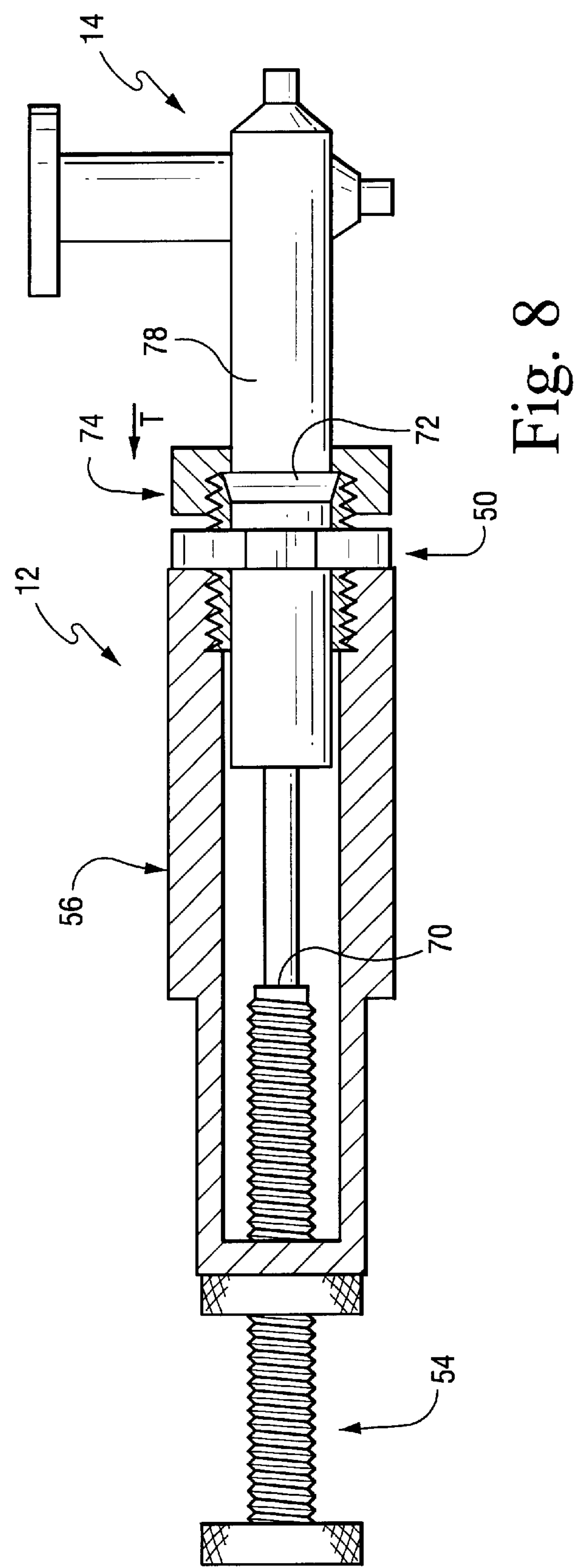
FIG. 8 is a schematic view partly in cross-section of the transfer of the measured target probe depth to a probe holder.
Figure 9:
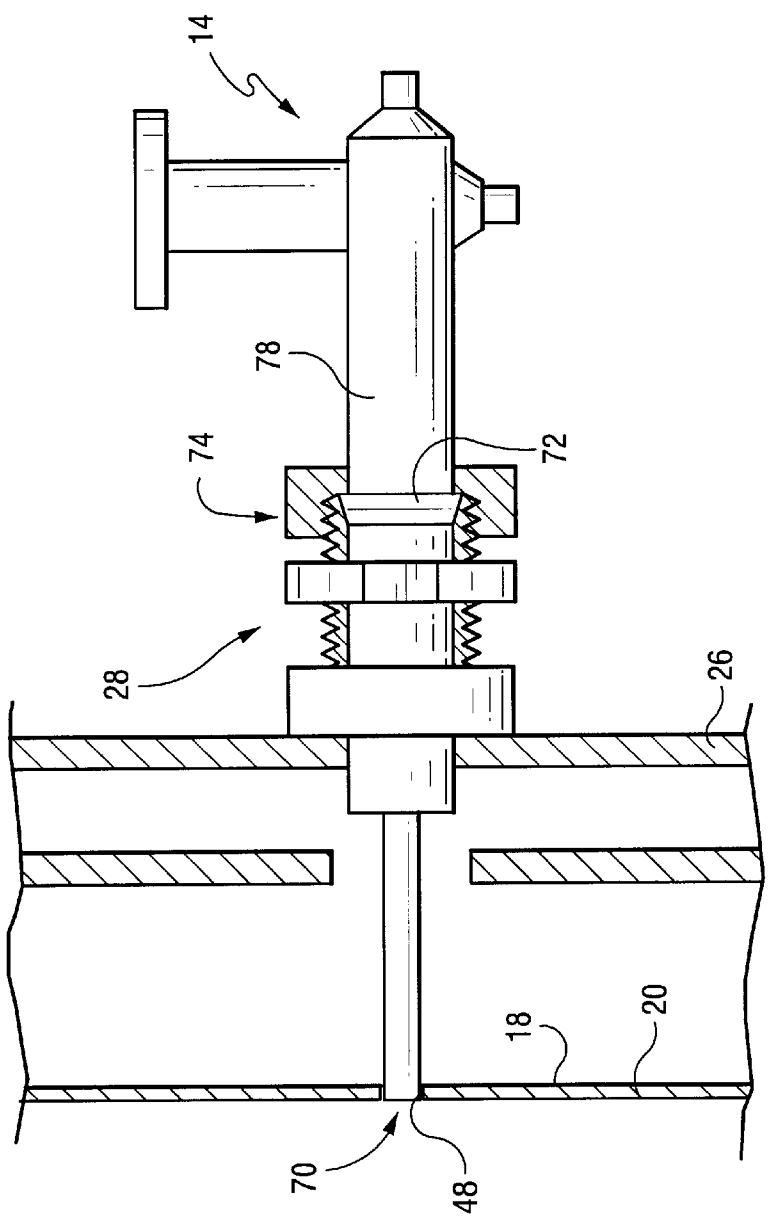
FIG. 9 is a schematic view partly in cross-section showing the probe device coupled to the casing.

Once the depth setting bolt 54 has been adjusted and set, the measurement fixture 10 may be removed and held for reuse during subsequent probe measurement and placement, and the transfer fixture 12 may now be used to mark the target depth of the probe on the probe device or holder itself. More particularly, referring now to FIG. 8, the probe device 14 that is to be coupled to the combustor casing 26 is inserted through the connector structure 50 until the probe tip 70 abuts the depth setting bolt 54. With the probe so disposed, and the ferrule(s) 72 is displaced so as to align with the complimentary portion 64 of the connector assembly, the fitting 74 is then tightened as shown by arrow T to lock the ferrule(s) 72 in place at the correct position on the probe device shaft 78. With the target depth thus recorded or marked on the probe device 14, the fitting 74 can be released and the dynamics probe device removed for engagement in due course with the combustion casing. Because the ferrule 72 has been locked in position on the shaft of the probe device, when the probe is inserted through the connector of the combustor casing, as shown in FIG. 9, engagement of the locked ferrule(s) 72 with the Swagelok® connector 28 of the combustion casing 26 indicates that the probe tip 70 is properly disposed with respect to the combustion liner 20 and the fitting 74 may then be tightened to secure the probe with respect to the combustor casing.

By way of non-limiting example, in the illustrated embodiment the probe device 14 is a T-shaped holder of the type disclosed in U.S. patent application Ser. No. 09/989,102 the entire disclosure of which is incorporated herein by this reference. The invention may also be used to mark and position probe devices of the type disclosed in co-pending U.S. patent application Ser. No. 10/374,719, titled DYNAMIC PRESSURE PROBE HOLDER AND METHOD OF OBTAINING A DYNAMIC PRESSURE SIGNAL, the entire disclosure of which is incorporated herein by this reference. The invention may also be used to measure and mark insertion depth for other probes and instruments having a target depth with respect to a reference surface that is remote from an access/insertion point.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A kit for setting probe depth, comprising:

a measurement fixture for measuring a target probe insertion depth through a wall of a component, said measurement fixture including a shaft and a tip portion provided at a distal end of said shaft, and an indicator for indicating said target depth on said shaft; and a transfer fixture for transferring a depth indicated by said indicator of said measurement fixture to a probe holder device, said transfer fixture including a housing defining a receptacle for receiving said shaft and said tip portion, the receptacle having an adjustable depth to selectively correspond to the depth indicated by the indicator of the measurement fixture, whereby a probe holder device may thereafter be disposed in said transfer fixture to a depth corresponding to said indicated depth, and marked.

2. A kit as in claim 1, wherein said tip portion has a diameter less than said shaft whereby a shoulder is defined between said tip portion and said shaft.

3. A kit as in claim 1, wherein said indicator comprises a measurement barrel mounted to said shaft so as to be selectively axially shifted thereon.

4. A kit as in claim 3, further comprising a lock nut for locking said measurement barrel in position.

5. A kit as in claim 3, wherein said shaft includes a smooth surface portion and a threaded portion, said measurement barrel being disposed on said threaded portion.

6. A kit as in claim 1, wherein said indicator comprises at least one ferrule slidably disposed on said shaft.

7. A kit as in claim 6, wherein said indicator further comprises a measurement barrel mounted to said shaft so as to be selectively axially shifted thereon.

8. A kit as in claim 7, further comprising a lock nut for locking said measurement barrel in position.

9. A kit as in claim 7, wherein said shaft includes a smooth surface portion and a threaded portion, said ferrule being disposed on said smooth surface portion.

10. A kit as in claim 1, wherein said wall of said component comprises a first liner wall and a second, casing wall and wherein said tip portion has a length corresponding to a target length of a probe tip inwardly from an outer surface of said liner wall.

11. A kit as in claim 1, wherein a coupling corresponding to a probe holder device coupling provided on said wall is provided at a proximal, open end of said receptacle of said transfer fixture.

12. A kit as in claim 1, wherein a depth of said receptacle is determined by an axial depth bolt adjustably mounted to said housing.

13. A method of accurately placing a probe to a target depth comprising:

providing an assembly for receiving the probe comprising a first, liner wall and a second, casing wall, a receptacle being defined in the first wall for receiving a tip of the probe;

providing a measurement fixture having a shaft and a tip portion projecting from said shaft a distance corresponding in length to a target length of the probe inwardly from an outer surface of said first, liner wall;

disposing the measurement fixture through an orifice defined in said second, casing wall and inserting said tip portion into said receptacle to abut said shaft of said measurement fixture against said outer surface of said liner wall;

providing an indication of a position of said shaft at a predetermined point with respect to said second, casing wall;

providing a transfer fixture including a housing having a receptacle of variable depth for receiving the measurement fixture;

inserting said shaft into said receptacle so that said position indicator is aligned with a predetermined, complimentary portion of the fixture;

adjusting a depth of said receptacle so that a bottom of the receptacle engages the tip portion;

removing the measurement fixture;

inserting a probe holder device into said receptacle so that the probe tip engages a bottom of the receptacle; and marking said probe at a point corresponding to said complimentary portion.

14. A method as in claim 13, further comprising inserting said probe holder device through said second, casing wall of said assembly to dispose said marking thereof at said predetermined point with respect to said second, casing wall to dispose the probe tip at a target depth.

15. A method as in claim 13, wherein said tip portion has a diameter less than said shaft whereby a shoulder is defined between said tip portion and said shaft, said shoulder abutting said first, liner wall during said step of disposing.

16. A method as in claim 13, wherein said step of providing an indication comprises axially shifting a measurement barrel mounted to said shaft.

17. A method as in claim 16, further comprising locking said measurement barrel in position with a lock nut.

18. A method as in claim 16, wherein said shaft includes a smooth surface portion and a threaded portion, said measurement barrel being disposed on said threaded portion and said step of axially shifting comprises rotating said barrel with respect to said shaft.

19. A method as in claim 13, wherein said step of providing an indication comprises axially shifting at least one ferrule slidably disposed on said shaft.

20. A method as in claim 13, wherein a depth of said receptacle is determined by an axial depth bolt adjustably mounted to said housing.

* * * * *